United States Patent
Harumashi et al.

(10) Patent No.: US 11,859,037 B2
(45) Date of Patent: Jan. 2, 2024

(54) REACTIVE SILICON GROUP-CONTAINING POLYMER AND CURABLE COMPOSITION

(71) Applicant: KANEKA CORPORATION, Osaka (JP)

(72) Inventors: Tatsuro Harumashi, Hyogo (JP); Nodoka Kubota, Hyogo (JP)

(73) Assignee: KANEKA CORPORATION, Osaka (JP)

(*) Notice: Subject to any disclaimer, the term of this patent is extended or adjusted under 35 U.S.C. 154(b) by 148 days.

(21) Appl. No.: 17/035,364

(22) Filed: Sep. 28, 2020

(65) Prior Publication Data

US 2021/0009742 A1   Jan. 14, 2021

Related U.S. Application Data

(63) Continuation of application No. PCT/JP2019/013405, filed on Mar. 27, 2019.

(30) Foreign Application Priority Data

Mar. 30, 2018  (JP) ................ 2018-069712
Mar. 30, 2018  (JP) ................ 2018-070425

(51) Int. Cl.
| | | |
|---|---|---|
| C08F 283/06 | (2006.01) | |
| C09J 171/02 | (2006.01) | |
| C09J 163/00 | (2006.01) | |
| C08G 65/336 | (2006.01) | |
| C08L 101/10 | (2006.01) | |
| C09J 201/10 | (2006.01) | |
| C09K 3/10 | (2006.01) | |
| C08K 5/544 | (2006.01) | |

(52) U.S. Cl.
CPC .......... *C08F 283/06* (2013.01); *C09J 171/02* (2013.01)

(58) Field of Classification Search
None
See application file for complete search history.

(56) References Cited

U.S. PATENT DOCUMENTS

| | | | |
|---|---|---|---|
| 4,983,320 A | 1/1991 | Franklin et al. | |
| 5,039,712 A | 8/1991 | Brock | |
| 6,136,940 A | 10/2000 | Auner et al. | |
| 6,153,781 A | 11/2000 | Auner et al. | |
| 2004/0010055 A1* | 1/2004 | Bui .................. | A61K 6/887 |
| | | | 523/116 |
| 2005/0065285 A1 | 3/2005 | Buvat et al. | |
| 2006/0111505 A1 | 5/2006 | Schindler et al. | |
| 2008/0227910 A1 | 9/2008 | Odaka | |
| 2013/0280530 A1 | 10/2013 | Luckert et al. | |
| 2015/0133622 A1 | 5/2015 | Harumashi et al. | |
| 2016/0108235 A1* | 4/2016 | Miyafuji ............ | C08F 220/14 |
| | | | 524/425 |
| 2017/0226305 A1 | 8/2017 | Katano et al. | |
| 2018/0312653 A1 | 11/2018 | Katano | |

FOREIGN PATENT DOCUMENTS

| | | | |
|---|---|---|---|
| CN | 106574068 | A | 4/2017 |
| EP | 1046641 | A1 | 10/2000 |
| EP | 1264850 | A1 | 12/2002 |
| EP | 3398986 | A1 | 11/2018 |
| JP | S52-073998 | A | 6/1977 |
| JP | S60-006747 | A | 1/1985 |
| JP | H03-068636 | A | 3/1991 |
| JP | H04-218522 | A | 8/1992 |
| JP | 2000095942 | A | 4/2000 |
| JP | 2000-344784 | A | 12/2000 |
| JP | 2000-344785 | A | 12/2000 |
| JP | 2001-354830 | A | 12/2001 |
| JP | 2005-519180 | A | 6/2005 |
| JP | 2005-213473 | A | 8/2005 |
| JP | 2005-535779 | A | 11/2005 |
| JP | 2007-091935 | A | 4/2007 |
| JP | 2014-505743 | A | 3/2014 |
| JP | 2016108566 | A * | 6/2016 |
| WO | 2007/040143 | A1 | 4/2007 |
| WO | 2012/036109 | A1 | 3/2012 |
| WO | 2013/180203 | A1 | 12/2013 |
| WO | 2016/021630 | A1 | 2/2016 |
| WO | 2017/119396 | A1 | 7/2017 |

OTHER PUBLICATIONS

Wersig et al., "Novel nonionic siloxane surfactants," Applied Organometallic Chemistry, vol. 6, pp. 701-708, (1992) (Year: 1992).*

(Continued)

*Primary Examiner* — Randy P Gulakowski
*Assistant Examiner* — Ha S Nguyen
(74) *Attorney, Agent, or Firm* — Osha Bergman Watanabe & Burton LLP

(57) ABSTRACT

Provided are reactive silicon group-containing polymers and a curable composition containing said polymers. The curable composition provides a cured product having a low modulus, flexibility, excellent tensile strength, tensile elongation, and tear strength. The curable composition can also exhibit excellent rapid curing properties even when a low-activity catalyst has been added. In the reactive silicon group-containing polymer, a reactive silicon group, indicated by general formula (1): ($-Si(R^1)_{3-a}(X)_a$), is bonded to the molecular chain of the polymer and an atom adjacent to the reactive silicon group has an unsaturated bond. In general formula (1), each $R^1$ can independently indicate a C1-20 hydrocarbon group, and the $R^1$ hydrocarbon groups can be substituted and a hetero-containing group can be used. X can be a hydroxyl group or a hydrolyzable group, and a is 1, 2, or 3.

13 Claims, No Drawings

(56) References Cited

OTHER PUBLICATIONS

International Search Report issued in International Application No. PCT/JP2019/013405, dated Jun. 25, 2019 (1 page).
Written Opinion issued in International Application No. PCT/JP2019/013405, dated Jun. 25, 2019 (5 pages).
International Search Report issued in International Application No. PCT/JP2019/013407 dated Jun. 25, 2019 (3 pages).
Written Opinion issued in International Application No. PCT/JP2019/013407 dated Jun. 25, 2019 (6 pages).

* cited by examiner

REACTIVE SILICON GROUP-CONTAINING POLYMER AND CURABLE COMPOSITION

TECHNICAL FIELD

One or more embodiments relate to a reactive silicon group-containing polymer which has a reactive silicon group at an end and in which an atom adjacent to the reactive silicon group has an unsaturated bond; and a curable composition including the reactive silicon group-containing polymer.

BACKGROUND

Reactive silicon group-containing polymers have been known as moisture reactive polymers. The reactive silicon group-containing polymers have been included in many industrial products such as adhesives, sealing materials, coating materials, paints, pressure sensitive adhesives, and the like, and utilized in a wide range of fields (Patent Document 1).

Polymers having a main chain backbone consisting of various polymers such as a polyoxyalkylene-based polymer, a saturated hydrocarbon-based polymer, and a (meth)acrylic acid ester-based copolymer have been known as the reactive silicon group-containing polymers. Among them, a reactive silicon group-containing polymer having the polyoxyalkylene-based polymer as the main chain backbone has been widely applied since it is characterized in that the polymer is easily handleable due to its relatively low viscosity at room temperature and a cured product resulting from a reaction of the polymer also exhibits satisfactory elasticity, etc.

Physical properties of the cured product obtained using the reactive silicon group-containing polymer are affected by structure of the polymer and a position and the number of the reactive group. In particular, regarding elasticity and strength of the cured product, factors such as cross-linking density and a molecular weight between crosslinks have a great influence on the physical properties. An appropriate molecular weight between crosslinks is needed in order to impart the elasticity to the cured product. Furthermore, a cured product with higher cross-linking density tends to have higher strength. The molecular weight between cross-links with some degree of uniformity is effective to obtain a cured product having excellent strength. Therefore, the reactive groups preferably exist at ends of a molecular chain. Meanwhile, the reactive group needs to efficiently exist at the ends in order to increase the cross-linking density.

For example, a reactive silicon group-containing polyoxyalkylene-based polymer, which is one of the reactive silicon group-containing polymers, is obtained by subjecting an epoxy compound to a ring-opening polymerization, introducing carbon-carbon unsaturated groups into terminal hydroxyl groups, and then subjecting the carbon-carbon unsaturated groups and a silane compound to a hydrosilylation reaction (Patent Document 2). However, the polyoxyalkylene-based polymer in which the reactive groups efficiently exist at the ends was not able to be easily obtained by this method.

Meanwhile, a method for synthesizing a polyoxyalkylene-based polymer having a plurality of reactive silicon groups per end has also been known (Patent Document 3). Although a cured product obtained using the polymer obtained by this synthesizing method has an advantage of exhibiting excellent strength due to its high cross-linking density, the cured product may result in a higher modulus and flexibility thereof is easily reduced.

Furthermore, a dialkoxymethylsilyl group has been the most frequently used as the above-described reactive silicon group due to a well-balanced reactivity and storage stability. However, in adhesive use requiring a high curing rate, the curing rate was insufficient in some cases.

Therefore, it has been proposed to improve the curing rate using a method in which a trialkoxysilyl group is used as the reactive silicon group (Patent Document 4) and a method in which a silyl group having an electron-withdrawing group such as a methoxymethyl group and a chloromethyl group is used (Patent Document 5). However, these methods did not produce sufficient curability in some cases, for example, in the case of a very small catalytic amount. Furthermore, polymers described in Patent Documents 6 and 7 have also been known to improve the curing rate, however, they were not able to be used when a complete tin-free system is required since a tin compound is used for producing the polymers.

Patent Document 1: Japanese Unexamined Patent Application, Publication No. S60-006747
Patent Document 2: Japanese Unexamined Patent Application, Publication No. S52-73998
Patent Document 3: PCT International Publication No. WO2013/180203
Patent Document 4: PCT International Publication No. WO2007/040143
Patent Document 5: PCT International Publication No. WO2012/036109
Patent Document 6: Japanese Unexamined Patent Application (Translation of PCT Application), Publication No. 2005-535779
Patent Document 7: Japanese Unexamined Patent Application (Translation of PCT Application), Publication No. 2014-505743

SUMMARY

One or more embodiments provide a reactive silicon group-containing polymer that provides a cured product having a low modulus, flexibility, and excellent tensile strength, tensile elongation, and tear strength and that exhibits excellent rapid curability even when a low-activity catalyst is added; and a curable composition containing the polymer.

The present inventors conducted extensive studies and have completed one or more embodiments of the following disclosure. That is, one or more embodiments relate to the following:

(1). A reactive silicon group-containing polymer having a reactive silicon group represented by General Formula (1):

$$-\text{Si}(R^1)_{3-a}(X)_a \tag{1}$$

in which $R^1$ each independently is a hydrocarbon group having 1 to 20 carbon atoms, the hydrocarbon group as $R^1$ may be substituted and may have a hetero-containing group, X is a hydroxyl group or a hydrolyzable group, and a is 1, 2, or 3, in which an atom adjacent to the reactive silicon group has an unsaturated bond.

(2). The reactive silicon group-containing polymer according to (1), in which the reactive silicon group-containing polymer has at least one structure selected from the group consisting of structures represented by General Formulas (2) to (4):

[Chem. 1]

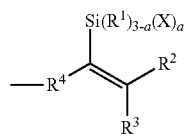

(2)

[Chem. 2]

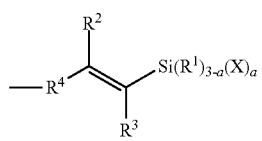

(3)

[Chem. 3]

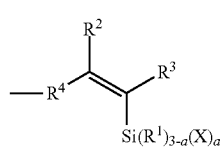

(4)

in which $R^4$ is a divalent linking group, each of two bonds that $R^4$ has is bonded to a carbon atom, an oxygen atom, a nitrogen atom, or a sulfur atom in the linking group, $R^2$ and $R^3$ each independently is hydrogen, an alkyl group having 1 to 20 carbon atoms, an aryl group having 6 to 20 carbon atoms, an aralkyl group having 7 to 20 carbon atoms, or a silyl group, and $R^1$, X, and a are as described above.

(3). The reactive silicon group-containing polymer according to (2), in which the structures represented by General Formulas (2) to (4) are structures represented by General Formulas (5) to (7), respectively:

[Chem. 4]

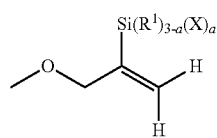

(5)

[Chem. 5]

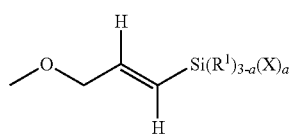

(6)

[Chem. 6]

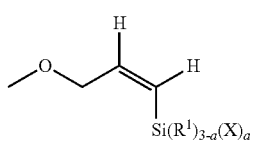

(7)

(4). The reactive silicon group-containing polymer according to any one of (1) to (3), in which the reactive silicon group-containing polymer has the reactive silicon group represented by General Formula (1) in an average number of more than 0.8 per end.

(5). The reactive silicon group-containing polymer according to any one of (1) to (4), in which the reactive silicon group is a dimethoxymethylsilyl group.

(6). The reactive silicon group-containing polymer according to any one of (1) to (4), in which the reactive silicon group is a trimethoxysilyl group and/or a (methoxymethyl)dimethoxysilyl group.

(7). The reactive silicon group-containing polymer according to any one of (1) to (6), in which a main chain backbone of the reactive silicon group-containing polymer is a polyoxyalkylene-based polymer.

(8). A curable composition, including: the (A) reactive silicon group-containing polymer according to any one of (1) to (7).

(9). The curable composition according to (8), in which the curable composition contains the (A) reactive silicon group-containing polymer; and a (B) curing catalyst.

(10). The curable composition according to (9), in which the curable composition includes, as the (B) curing catalyst, at least one selected from the group consisting of an organotin compound, a metal carboxylate, an amine compound, a carboxylic acid, and an alkoxy metal.

(11). The curable composition according to (9), in which the curable composition includes, as the (B) curing catalyst, a silane coupling agent having a hydrolyzable silicon group and an amino group in a molecule.

(12). The curable composition according to (11), in which the curable composition includes, as the (B) curing catalyst, no curable catalyst other than the silane coupling agent having a hydrolyzable silicon group and an amino group in a molecule.

(13). A cured product of the curable composition according to any one of (8) to (12).

(14). A method for producing a cured product, including: applying, casting, or filling the curable composition according to any one of (8) to (12); and curing the curable composition which has been applied, cast, or filled.

(15). A sealing material or an adhesive, consisting of the curable composition according to any one of (8) to (12).

According to one or more embodiments, a reactive silicon group-containing polymer that provides a cured product having excellent tensile strength, tear strength, and tensile elongation despite a low modulus and that exhibits excellent rapid curability even when a low-activity catalyst is added; and a curable composition containing the polymer can be provided.

DETAILED DESCRIPTION OF THE EMBODIMENTS

<<Reactive Silicon Group-Containing Polymer>>

A reactive silicon group-containing polymer has a reactive silicon group represented by General Formula (1):

(1)

in which $R^1$ each independently is a hydrocarbon group having 1 to 20 carbon atoms, the hydrocarbon group as $R^1$ may be substituted and may have a hetero-containing group, X is a hydroxyl group or a hydrolyzable group, and a is 1, 2, or 3. Furthermore, in the reactive silicon group-containing polymer, an atom adjacent to the reactive silicon group has an unsaturated bond. In the reactive silicon group-containing polymer, when the atom adjacent to the reactive silicon group has the unsaturated bond, condensation reactivity is significantly increased. Therefore, the reactive silicon group-containing polymer meeting the above-described requirements exhibits excellent rapid curability even when a low-activity catalyst is added.

<Reactive Silicon Group>

The reactive silicon group in the reactive silicon group-containing polymer is represented by General Formula (1):

$$—Si(R^1)_{3-a}(X)_a \qquad (1)$$

in which $R^1$ each independently is a hydrocarbon group having 1 to 20 carbon atoms, the hydrocarbon group as $R^1$ may be substituted and may have a hetero-containing group, X is a hydroxyl group or a hydrolyzable group, and a is 1, 2, or 3.

$R^1$ is a hydrocarbon group having 1 to 20 carbon atoms. The hydrocarbon group as $R^1$ has preferably 1 to 12 carbon atoms, more preferably 1 to 6 carbon atoms, and particularly preferably 1 to 4 carbon atoms.

The hetero-containing group that the hydrocarbon group as $R^1$ may have as a substituent is a group including a heteroatom. Here, the heteroatom refers to an atom other than a carbon atom and a hydrogen atom.

Suitable examples of the heteroatom include N, O, S, P, Si, and a halogen atom. Regarding the hetero-containing group, the total number of carbon atoms and hetero atoms is preferably 1 to 10, more preferably 1 to 6, and further preferably 1 to 4. Suitable examples of the hetero-containing group include a hydroxyl group; a mercapto group; a halogen atom such as Cl, Br, I, and F; a nitro group; a cyano group; an alkoxy group such as a methoxy group, an ethoxy group, an n-propyloxy group, and an isopropyloxy group; an alkylthio group such as a methylthio group, an ethylthio group, an n-propylthio group, and an isopropylthio group; an acyl group such as an acetyl group, a propionyl group, and a butanoyl group; an acyloxy group such as an acetyloxy group, a propionyloxy group, and a butanoyloxy group; a substituted or unsubstituted amino group such as an amino group, a methylamino group, an ethylamino group, a dimethylamino group, and a diethylamino group; a substituted or unsubstituted aminocarbonyl group such as an aminocarbonyl group, a methylaminocarbonyl group, an ethylaminocarbonyl group, a dimethylaminocarbonyl group, and a diethylaminocarbonyl group; a cyano group, and the like.

When $R^1$ is a hydrocarbon group substituted with a hetero-containing group, $R^1$ has the total number of carbon atoms and hetero atoms of preferably 2 to 30, more preferably 2 to 18, further preferably 2 to 10, and particularly preferably 2 to 6.

Specific Examples of the hydrocarbon group having 1 to 20 carbon atoms as $R^1$ include an alkyl group such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-octadecyl group, an n-nonadecyl group, and an n-icosyl group; an alkenyl group such as a vinyl group, a 2-propenyl group, a 3-butenyl group, and a 4-pentenyl group; a cycloalkyl group such as a cyclopropyl group, a cyclobutyl group, a cyclopentyl group, a cyclohexyl group, a cycloheptyl group, and a cyclooctyl group; an aryl group such as a phenyl group, a naphthalen-1-yl group, a naphthalen-2-yl group, a o-phenylphenyl group, a m-phenylphenyl group, and a p-phenylphenyl group; an aralkyl group such as benzyl group, a phenethyl group, a naphthalen-1-ylmethyl group, and a naphthalen-2-ylmethyl group. Groups in which these hydrocarbon groups are substituted with the above-described hetero-containing groups are also preferred as $R^1$.

Suitable examples of $R^1$ include a hydrogen atom; an alkyl group such as a methyl group and an ethyl group; an alkyl group having a hetero-containing group such as a chloromethyl group and a methoxymethyl group; a cycloalkyl group such as a cyclohexyl group; an aryl group such as a phenyl group; an aralkyl group such as a benzyl group, and the like. $R^1$ is preferably a hydrogen atom, a methyl group, a methoxymethyl group, and a chloromethyl group, more preferably a methyl group and a methoxymethyl group, and further preferably a methoxymethyl group.

Examples of X include a hydroxyl group, hydrogen, halogen, an alkoxy group, an acyloxy group, a ketoximate group, an amino group, an amide group, an acid amide group, an aminooxy group, a mercapto group, and an alkenyloxy group. Among them, from the viewpoint of being mildly hydrolyzable and easily handleable, an alkoxy group such as a methoxy group and an ethoxy group is more preferred, and a methoxy group and an ethoxy group are particularly preferred.

a is 1, 2, or 3. a is preferably 2 or 3.

The reactive silicon group is not particularly limited, as long as it is a group represented by the Formula (1). The reactive silicon group represented by Formula (1) is preferably a group represented by General Formula (1-1) below:

$$—Si(R^{10})_{3-b}(OR^{11})_b \qquad (1\text{-}1)$$

in which $R^{10}$ each independently is an alkyl group having 1 to 6 carbon atoms, a haloalkyl group having 1 to 6 carbon atoms, an alkoxyalkyl group having 2 to 6 carbon atoms, or an N,N-dialkylaminoalkyl group represented by —$R^{12}$N$(R^{13})_2$, $R^{12}$ is a methyl group or an ethyl group; $R^{13}$ is a methyl group or an ethyl group, $R^{11}$ is an alkyl group having 1 to 6 carbon atoms, an alkenyl group having 2 to 6 carbon atoms, or an acyl group having 2 to 6 carbon atoms, and b is 2 or 3.

Specific examples of the alkyl group having 1 to 6 carbon atoms as $R^{10}$ include a methyl group, an ethyl group, an n-propyl group, an isopropyl group, an n-butyl group, an isobutyl group, a sec-butyl group, a tert-butyl group, an n-pentyl group, and an n-hexyl group. Among them, a methyl group and an ethyl group are preferred. Specific examples of the haloalkyl group having 1 to 6 carbon atoms as $R^{10}$ include a chloromethyl group, a dichloromethyl group, a trichloromethyl group, a bromomethyl group, a dibromomethyl group, a tribromomethyl group, a 2-chloroethyl group, and a 2-bromoethyl group. Among them, a chloromethyl group and a bromomethyl group are preferred, and a chloromethyl group is more preferred. Specific examples of the alkoxyalkyl group having 2 to 6 carbon atoms as $R^{10}$ include a methoxymethyl group, a 2-methoxyethyl group, a 1-methoxyethyl group, an ethoxymethyl group, a 2-ethoxyethyl group, an n-propyloxymethyl group, and a 2-n-propyloxyethyl group. Among them, a methoxymethyl group, a 2-methoxyethyl group, and an ethoxymethyl group are preferred, and a methoxymethyl group is more preferred. Specific examples of the N,N-dialkylaminoalkyl group represented by —$R^{12}$N$(R^{13})_2$ as $R^{10}$ include an N,N-dimethylaminomethyl group, an N,N-diethylaminoethyl group, a 2-N,N-dimethylaminoethyl group, and a 2-N,N-diethylaminoethyl group. Among them, an N,N-dimethylaminomethyl group and an N,N-diethylaminomethyl group are preferred, and an N,N-diethylaminomethyl group is more preferred.

Specific examples of the alkyl group having 1 to 6 carbon atoms as $R^{11}$ include a methyl group, an ethyl group, an n-propyl group, an isopropyl group, an n-butyl group, an isobutyl group, a sec-butyl group, a tert-butyl group, an n-pentyl group, and an n-hexyl group. Among them, a methyl group and an ethyl group are preferred. Specific examples of the alkenyl group having 2 to 6 carbon atoms as $R^{11}$ include a vinyl group, a 2-propenyl group, a 3-butenyl group, and a 4-pentenyl group. Among them, a vinyl group and a 2-propenyl group are preferred. Specific examples of the acyl group having 2 to 6 carbon atoms as $R^{11}$ include an acetyl group, a propionyl group, a butanoyl group, and a pentanoyl group. Among them, an acetyl group is preferred.

Specific examples of the reactive silicon group include, but are not limited to a trimethoxysilyl group, a triethoxysilyl group, a tris(2-propenyloxy)silyl group, a triacetoxysilyl group, a dimethoxymethylsilyl group, a diethoxymethylsilyl group, a dimethoxyethylsilyl group, a (chloromethyl)dimethoxysilyl group, a (chloromethyl)diethoxysilyl group, a (methoxymethyl)dimethoxysilyl group, a (methoxymethyl)diethoxysilyl group, an (N,N-diethylaminomethyl)dimethoxysilyl group, and an (N,N-diethylaminomethyl)diethoxysilyl group. Among them, a dimethoxymethylsilyl group, a trimethoxysilyl group, a triethoxysilyl group, and a (methoxymethyl)dimethoxysilyl group are preferred since a cured product having a satisfactory mechanical physical property is obtained. From the viewpoint of activity, a trimethoxysilyl group, a (chloromethyl)dimethoxysilyl group, and a (methoxymethyl)dimethoxysilyl group are more preferred, and trimethoxysilyl group and a (methoxymethyl)dimethoxysilyl group are particularly preferred. From the viewpoint of stability, a dimethoxymethylsilyl group and a triethoxysilyl group are more preferred, and a dimethoxymethylsilyl group is particularly preferred.

The average number of the reactive silicon groups included per molecule is preferably 0.5 or more, more preferably 1.0 or more, and further preferably 1.2 or more. The upper limit thereof is preferably 4 or less, and more preferably 3 or less.

Furthermore, the reactive silicon group-containing polymer has preferably the above-described reactive silicon groups in an average number of more than 0.8 per end, since the desired effects are easily obtained. This enables a sufficient number of the reactive silicon groups to be introduced at the ends, resulting in a cured product having a sufficient cross-linking density and improved strength. Meanwhile, the reactive silicon group may exist in an average number of more than 1.0 per end, but this is not preferred due to reduced flexibility. Therefore, the reactive silicon group preferably exists in an average number of more than 0.8 but 1.0 or less per end.

Herein, the term "end" includes a chain end and an adjacent structure thereof in a polymer molecular chain. More specifically, the term may be defined as a group substituted on bonded atoms corresponding to 20% by number, more preferably 10% by number from the end among the bonded atoms constituting the polymer molecular chain. Furthermore, when expressed in terms of the number of the bonded atoms, the term "end site" may be defined as 50 atoms, more preferably 30 atoms from the end of the polymer molecular chain.

A method for obtaining the reactive silicon group-containing polymer having the reactive silicon group in the average number of more than 0.8 per end is not particularly limited. Examples of the method include (1) a method in which a polymer having a methallyl group at the end and hydrosilane undergo a hydrosilylation reaction, (2) a method in which a polymer having a hydroxyl group at the end is allowed to react with isocyanatesilane, and (3) a method in which a polymer having an isocyanate group at the end is allowed to react with aminosilane. However, the method (1), in terms of a reduced curing rate and productivity, and methods (2) and (3), in terms of heat resistance, are not able to be used when a complete tin-free system is required because these methods need to use a tin compound.

In the reactive silicon group-containing polymer, the atom adjacent to the reactive silicon group has the unsaturated bond. The atom adjacent to the reactive silicon is not particularly limited, but carbon is preferred. The unsaturated bond is not particularly limited, but a carbon-carbon double bond is preferred.

A structure of the end site in the reactive silicon group-containing polymer is preferably at least one structure represented by General Formulas (2) to (4) below:

[Chem. 7]

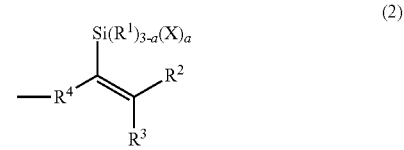

(2)

[Chem. 8]

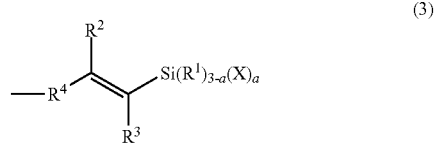

(3)

[Chem. 9]

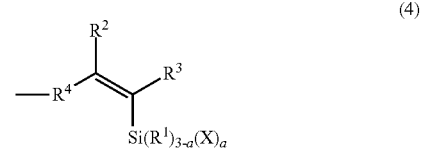

(4)

in which $R^4$ is a divalent linking group, each of two bonds that $R^4$ has is bonded to a carbon atom, an oxygen atom, a nitrogen atom, or a sulfur atom in the linking group, and $R^2$ and $R^3$ each independently is hydrogen, an alkyl group having 1 to 20 carbon atoms, an aryl group having 6 to 20 carbon atoms, an aralkyl group having 7 to 20 carbon atoms, or a silyl group. $R^1$, X, and a are the same as described above.

$R^4$ is the divalent linking group. Each of two bonds that $R^4$ has is bonded to a carbon atom, an oxygen atom, a nitrogen atom, or a sulfur atom in the linking group. Here, the phrase "each of two bonds that $R^4$ has is bonded to a carbon atom, an oxygen atom, a nitrogen atom, or a sulfur atom in the linking group" means that each of two bonds that $R^4$ has exists on a carbon atom, an oxygen atom, a nitrogen atom, or a sulfur atom in the linking group. Specific examples of the divalent linking group include —$(CH_2)_n$—, —O—$(CH_2)_n$—, —S—$(CH_2)_n$—, —$NR^5$—$(CH_2)_n$—, —O—C(=O)—$NR^5$—$(CH_2)_n$—, and —$NR^5$—C(=O)—$NR^5$—$(CH_2)_n$—. Among them, —O—$(CH_2)_n$—, —O—C(=O)—$NR^5$—$(CH_2)_n$—, and —$NR^5$—C(=O)—$NR^5$—$(CH_2)_n$— are preferred, and —O—$CH_2$— is more preferred from the viewpoint of availability of raw materials. $R^5$ is a hydrogen atom or a hydrocarbon group having 1 to 10 carbon atoms. Examples of the hydrocarbon group as $R^5$ include an alkyl group such as a methyl group, an ethyl group, an n-propyl group, and an isopropyl group; an aryl group such as a phenyl group and a naphthyl group; an aralkyl group such as a benzyl group, n is preferably an integer of 0 to 10, more preferably an integer of 0 to 5, further preferably an integer of 0 to 2, particularly preferably 0 or 1, and most preferably 1.

$R^2$ and $R^3$ each independently is hydrogen, an alkyl group having 1 to 20 carbon atoms, an aryl group having 6 to 20 carbon atoms, an aralkyl group having 7 to 20 carbon atoms, or a silyl group. The alkyl group has preferably 1 to 12 carbon atoms, more preferably 1 to 6 carbon atoms, and particularly preferably 1 to 4 carbon atoms. The aryl group has preferably 6 to 12 carbon atoms and more preferably 6 to 10 carbon atoms. The aralkyl group has preferably 7 to 12 carbon atoms. Specific examples of $R^2$ and $R^3$ include hydrogen; an alkyl group such as a methyl group, an ethyl group, and a cyclohexyl; an aryl group such as a phenyl group and a tolyl group; an aralkyl group such as a benzyl group and a phenethyl group; a silyl group such as a trimethylsilyl group. Among them, hydrogen, a methyl group, and a trimethylsilyl group are preferred, and hydrogen and a methyl group are more preferred, and hydrogen is further preferred.

The end site of the reactive silicon group-containing polymer is more preferably at least one structure represented by General Formulas (5) to (7) below:

[Chem. 10]

(5)

[Chem. 11]

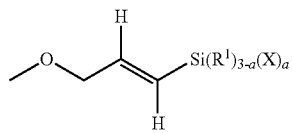

(6)

[Chem. 12]

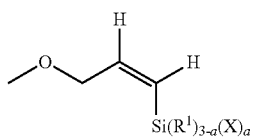

(7)

In General Formulas (5) to (7) above, $R^1$, X, and a are the same as described above.

The end site of the reactive silicon group-containing polymer is more preferably at least one structure represented by General Formulas (5-1) to (7-1) below:

[Chem. 13]

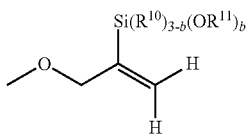

(5-1)

[Chem. 14]

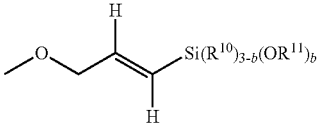

(6-1)

[Chem. 15]

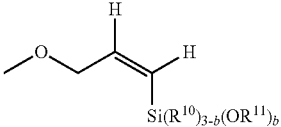

(7-1)

In General Formulas (5-1) to (7-1) above, $R^{10}$, $R^{11}$, and b are the same as described above.

<Main Chain Structure>

A main chain structure of the reactive silicon group-containing polymer may be linear or have a branched chain. The main chain backbone of the reactive silicon group-containing polymer is not particularly limited. Polymers having various main chain backbones can be used as the reactive silicon group-containing polymer. Examples of the main chain backbone of the reactive silicon group-containing polymer include an organic polymer, for example, a polyoxyalkylene-based polymer such as polyoxyethylene, polyoxypropylene, polyoxybutylene, polyoxytetramethylene, a polyoxyethylene-polyoxypropylene copolymer, and a polyoxypropylene-polyoxybutylene copolymer; a saturated hydrocarbon-based polymer such as an ethylene-propylene-based copolymer, a copolymer of polyisobutylene, isobutylene with isoprene, etc., a copolymer of polychloroprene, polyisoprene, isoprene or butadiene with acrylonitrile and/or styrene, etc., a copolymer of polybutadiene, isoprene or butadiene with acrylonitrile and styrene, etc., and a hydrogenated polyolefin-based polymer that is obtained by hydrogenating these polyolefin-based polymers; a polyester-based polymer; a (meth)acrylic acid ester-based polymer that is obtained by subjecting a (meth)acrylic acid ester-based monomer to radical polymerization such as ethyl(meth)acrylate, butyl(meth)acrylate, etc., and a vinyl-based polymer such as a polymer that is obtained by subjecting a monomer such as a (meth)acrylic acid-based monomer, vinyl acetate, acrylonitrile, and styrene to radical polymerization; a graft polymer that is obtained by polymerizing a vinyl monomer in the above-described polymer; a polysulfide-based polymer; a polyamide-based polymer; a polycarbonate-based polymer; a diallyl phthalate-based polymer. Each of the above-described polymers may be a polymer in which blocked regions and grafted regions are mixed. Among them, a saturated hydrocarbon-based polymer, a polyoxyalkylene-based polymer, and a (meth)acrylic acid ester-based polymer are preferred from the viewpoints of a relatively low glass transition temperature and excellent cold resistance of a cured product obtained therefrom, and a polyoxyalkylene-based polymer is more preferred.

The reactive silicon group-containing polymer may be a polymer having any one main chain backbone of the above-described various main chain backbones or a mixture of polymers having different main chain backbones. Furthermore, the mixture may be a mixture of polymers that are produced separately or a mixture of polymers that are produced simultaneously so as to give any mixed composition.

The reactive silicon group-containing polymer has preferably a number average molecular weight in terms of polystyrene as measured by GPC of 3,000 to 100,000, more preferably 3,000 to 50,000, and particularly preferably 3,000 to 30,000. When the number average molecular weight falls within the above-described range, the reactive silicon group is introduced in an appropriate amount. Therefore, a reactive silicon group-containing polymer having an easily handleable viscosity and excellent workability is easily obtained, while keeping production costs within an appropriate range.

A molecular weight of the reactive silicon group-containing polymer can also be expressed in an end group-based molecular weight which is determined by directly measuring an end group concentration of a polymer precursor prior to introduction of the reactive silicon group thereinto using a method for measuring a hydroxyl value according to JIS K 1557 and a titration analysis based on the principle of a method for measuring an iodine value as defined in JIS K 0070 in view of the structure of the polymer (the degree of branching defined by a polymerization initiator used). The end group-based molecular weight of the reactive silicon group-containing polymer may also be determined by creating a calibration curve between the number average molecular weight determined by a standard GPC measurement and the end group-based molecular weight of the polymer precursor, and converting the number average molecular weight determined by GPC of the reactive silicon group-containing polymer into the end group-based molecular weight.

A molecular weight distribution (Mw/Mn) of the reactive silicon group-containing polymer is not particularly limited. The molecular weight distribution is preferably narrow, preferably less than 2.0, more preferably 1.6 or less, further preferably 1.5 or less, even more preferably 1.4 or less, particularly preferably 1.3 or less, and most preferably 1.2 or less. The molecular weight distribution of the reactive silicon group-containing polymer can be determined from a number average molecular weight and a weight average molecular weight obtained by GPC measurement.

<Method for Synthesizing Reactive Silicon Group-Containing Polymer>

A method for synthesizing the reactive silicon group-containing polymer will now be described.

(Polyoxyalkylene-Based Polymer)

When the polyoxyalkylene-based polymer is used as a main chain of the reactive silicon group-containing polymer, a hydroxyl group-terminated polyoxyalkylene-based polymer is obtained by a method in which a hydroxyl group-containing initiator is polymerized with an epoxy compound using a composite metal cyanide complex catalyst such as a zinc hexacyanocobaltate-glyme complex, and then (i) a method in which a carbon-carbon triple bond is introduced into a hydroxyl group in the resultant hydroxyl group-terminated polyoxyalkylene-based polymer and then a silane compound is added to the carbon-carbon triple bond through a hydrosilylation reaction; (ii) a method in which the resultant hydroxyl group-terminated polyoxyalkylene-based polymer is reacted with a compound having a hydroxyl group-reactive group, a reactive silicon group, and a carbon-carbon double bond; and (iii) a method in which the hydroxyl group-terminated polyoxyalkylene-based polymer is reacted with an excess of a polyisocyanate compound to thereby form an isocyanate group-terminated polymer and then reacted with a compound having an isocyanate group-reactive group, a reactive silicon group, and a carbon-carbon double bond are preferably used. Among these methods, the method (i) is more preferred from the viewpoints of simplicity of the reaction, adjustment of an amount of introduction of the reactive silicon group, and stable physical properties of the resultant reactive silicon group-containing polymer. These methods can be used to obtain a reactive silicon group-containing polymer having an introduction rate of a silyl group into an end of the polymer of 80% or more, which is difficult to achieve through hydroxylation of a polymer having an allyl group, i.e., a carbon-carbon double bond at the end.

An example of the hydroxyl group-containing initiator includes a compound having one or more hydroxyl groups such as ethylene glycol, propylene glycol, glycerin, pentaerythritol, low-molecular weight polypropylene glycol, polyoxypropylene triol, allyl alcohol, polypropylene monoallylether, and polypropylene monoalkylether.

Examples of the epoxy compound include alkylene oxides such as ethylene oxide and propylene oxide; glycidyl ethers such as methyl glycidyl ether and allyl glycidyl ether, and the like. Among them, propylene oxide is preferred.

An example of a group having a carbon-carbon triple bond includes an alkynyl group. Furthermore, other unsaturated groups such as a vinyl group, an allyl group, a methallyl group, or the like may be introduced into a terminal hydroxyl group concomitantly with the alkynyl group.

As a method for introducing the carbon-carbon triple bond into the terminal hydroxyl group in the method (i), a method in which a terminal hydroxyl group-containing polymer is treated with an alkali metal salt and then is reacted with a halogenated hydrocarbon compound having a carbon-carbon triple bond is preferably used. Examples of the alkali metal salt include sodium hydroxide, sodium alkoxide, potassium hydroxide, potassium alkoxide, lithium hydroxide, lithium alkoxide, cesium hydroxide, and cesium alkoxide. From the viewpoints of easiness of handling and solubility, sodium hydroxide, sodium methoxide, sodium ethoxide, potassium hydroxide, potassium methoxide, and potassium ethoxide are preferred, and sodium methoxide and potassium methoxide are more preferred. From the viewpoint of availability, sodium methoxide is particularly preferred. The alkali metal salt may be used in a dissolved state in a solvent.

Examples of the halogenated hydrocarbon compound having a carbon-carbon triple bond used in the method (i) include propargyl chloride, 1-chloro-2-butyne, 4-chloro-1-butyne, 1-chloro-2-octyne, 1-chloro-2-pentyne, 1,4-dichloro-2-butyne, 5-chloro-1-pentyne, 6-chloro-1-hexyne, propargyl bromide, 1-bromo-2-butyne, 4-bromo-1-butyne, 1-bromo-2-octyne, 1-bromo-2-pentyne, 1,4-dibromo-2-butyne, 5-bromo-1-pentyne, 6-bromo-1-hexyne, propargyl iodide, 1-iodo-2-butyne, 4-iodo-1-butyne, 1-iodo-2-octyne, 1-iodo-2-pentyne, 1,4-diiodo-2-butyne, 5-iodo-1-pentyne, and 6-iodo-1-hexyne. Among them, propargyl chloride, propargyl bromide, and propargyl iodide are more preferred. Furthermore, a halogenated hydrocarbon compound having an unsaturated bond other than the halogenated hydrocarbon compound having a carbon-carbon triple bond such as vinyl chloride, allyl chloride, methallyl chloride, vinyl bromide, allyl bromide, methallyl bromide, vinyl iodide, allyl iodide, and methallyl iodide may be used concomitantly with the halogenated hydrocarbon compound having a carbon-carbon triple bond.

Examples of a hydrosilane compound used in the method (i) include halogenated silanes such as trichlorosilane, dichloromethylsilane, chlorodimethylsilane, and dichlorophenylsilane; alkoxy silanes such as trimethoxysilane, triethoxysilane, dimethoxymethylsilane, diethoxymethylsilane, dimethoxyphenylsilane, ethyldimethoxysilane, methoxydimethylsilane, ethoxydimethylsilane, (chloromethyl)dimethoxysilane, (chloromethyl)diethoxysilane, (methoxymethyl)dimethoxysilane, (methoxymethyl)diethoxysilane, (N,N-diethylaminomethyl)dimethoxysilane, and (N, N-diethylaminomethyl)diethoxysilane; acyloxy silanes such as diacetoxymethylsilane and diacetoxyphenylsilane; ketoximate silanes such as bis(dimethylketoximate)methylsilane and bis(cyclohexylketoximate)methylsilane; isopropenyloxy silanes (de-acetone form) such as triisopropenyloxy silane.

((Meth)Acrylic Acid Ester-Based Polymer)

When the (meth)acrylic acid ester-based polymer is used as a main chain of the reactive silicon group-containing polymer, examples of a method for producing the reactive silicon group-containing polymer include (I) a method in which a compound having a polymerizable unsaturated group and a reactive functional group (e.g., acrylic acid, 2-hydroxyethyl acrylate) is copolymerized with a monomer having (meth)acrylic structure to thereby obtain a polymer, a carbon-carbon triple bond is introduced into any position in the resultant polymer (preferably, an end of a molecular chain thereof), and then a silane compound is added to the carbon-carbon triple bond through a hydrosilylation reaction to give a reaction silicon group; and (II) a method in which a monomer having (meth)acrylic structure is polymerized through a living radical polymerization method such as an atom transfer radical polymerization to thereby obtain a polymer, a carbon-carbon triple bond is introduced into any position in the resultant polymer (preferably, an end of a molecular chain thereof), and then a silane compound is added to the carbon-carbon triple bond through a hydrosilylation reaction to give a reaction silicon group.

(Saturated Hydrocarbon-Based Polymer)

When the saturated hydrocarbon-based polymer is used as a main chain of the reactive silicon group-containing polymer, an example of a method for producing the reactive silicon group-containing polymer includes a method in which, as a main monomer, an olefin-based compound having 2 to 6 carbon atoms such as ethylene, propylene, 1-butene, and isobutylene is polymerized to thereby obtain a polymer, a carbon-carbon triple bond is introduced into any position in the resultant polymer (preferably, an end of its molecular chain), and then a silane compound is added to the carbon-carbon triple bond through a hydrosilylation reaction to give a reaction silicon group.

<<Curable Compositions>>

The (A) reactive silicon group-containing polymer as described above (hereinafter, also referred to as an (A) component) is mixed with various additives, as necessary, to thereby obtain a curable composition. The curable composition typically includes a combination of the (A) reactive silicon group-containing polymer and a (B) curing catalyst (hereinafter, also referred to as a (B) component). Examples of additives other than the (B) curing catalyst include a filler, an adhesiveness imparting agent, a plasticizer, an anti-sagging agent, an antioxidant, a photostabilizer, an ultraviolet absorber, a physical property-adjusting agent, an epoxy group-containing compound, a photocurable material, an oxygen-curable material, and other resins than the reactive silicon group-containing polymer.

Furthermore, for the purpose of adjustment of physical properties of the curable composition or the cured product, the curable composition may be added with other additives than those described above, as necessary. Examples of such other additives include a tackifying resin, a solvent, a diluent, an epoxy resin, a surface modifier, a blowing agent, a curability adjusting agent, a flame retardant, silicate, a radical inhibitor, a metal deactivator, an antiozonant, a phosphorus-based peroxide decomposer, a lubricant, a pigment, a fungicide, and the like.

Each of representative additives will now be described.

<(B) Curing Catalyst>

For the curable composition, the (B) curing catalyst acting as a silanol condensation catalyst may be used for the purpose of facilitating a hydrolysis/condensation reaction of the reactive silicon group in the reactive silicon group-containing polymer and subjecting the polymer to chain extension or cross-linking.

Examples of the (B) curing catalyst include an organotin compound, a metal carboxylate, an amine compound, a carboxylic acid, and an alkoxy metal.

Specific examples of the organotin compound include dibutyltin dilaurate, dibutyltin dioctanoate, dibutyltin bis(butyl maleate), dibutyltin diacetate, dibutyltin oxide, dibutyltin bis(acetylacetonate), dioctyltin bis(acetylacetonate), a reaction product of dibutyltin oxide and a silicate compound, a reaction product of dioctyltin oxide and a silicate compound, and a reaction product of dibutyltin oxide and phthalic acid ester.

Specific examples of the metal carboxylate include tin carboxylate, bismuth carboxylate, titanium carboxylate, zirconium carboxylate, and iron carboxylate. Furthermore, a salt formed by combining the below-described carboxylic acid and various metals may be used as the metal carboxylate.

Specific examples of the amine compound include amines such as octyl amine, 2-ethylhexyl amine, lauryl amine, and stearyl amine; a nitrogen-containing heterocyclic compound such as pyridine, 1,8-diazabicyclo[5,4,0]undecene-7 (DBU) and 1,5-diazabicyclo[4,3,0]nonene-5 (DBN); guanidines such as guanidine, phenylguanidine, and diphenylguanidine; biguanides such as butylbiguanide, 1-o-tolylbiguanide, and 1-phenylbiguanide; an amino group-containing silane coupling agent; a ketimine compound, and the like.

Specific examples of the carboxylic acid include acetic acid, propionic acid, butyric acid, 2-ethylhexanoic acid, lauric acid, stearic acid, oleic acid, linoleic acid, neodecanoic acid, and versatic acid.

Specific examples of the alkoxy metal include titanium compounds such as tetrabutyl titanate, titanium tetrakis(acetylacetonate), and diisopropoxytitanium bis(ethylacetoacetate); aluminum compounds such as aluminum tris(acetylacetonate) and diisopropoxyaluminium ethyl acetoacetate; and zirconium compounds such as zirconium tetrakis(acetylacetonate).

As other (B) curing catalysts, a fluorine anion-containing compound, a photoacid generator, and a photobase generator may be also used.

Two or more kinds of different catalysts may also be used in combination as the (B) curing catalyst.

The reactive silicon group included in the (A) reactive silicon group-containing polymer is highly active. Therefore, for the curable composition, an amount of the (B) curing catalyst may be decreased, a catalyst having a lower activity may be used as the (B) curing catalyst, or aminosilane, which is an amino group-containing silane coupling agent, may be used as the (B) curing catalyst. Usually, the aminosilane is often added as an adhesiveness imparting agent. Therefore, when the aminosilane is used as the (B) curing catalyst, the curable composition can be produced without using a routinely-used curing catalyst. Therefore, it is more preferred that no other curing catalysts be added. Especially when the reactive silicon group is a trimethoxysilyl group or a methoxymethyldimethoxysilyl group, excellent curability can be achieved even with the use of only aminosilane as the (B) curing catalyst.

A typical amount of use of the (B) curing catalyst is preferably 0.001 to 20 parts by weight, more preferably 0.01 to 15 parts by weight, and particularly preferably 0.01 to 10 parts by weight, with respect to 100 parts by weight of the (A) reactive silicon group-containing polymer. When the organotin compound, the metal carboxylate, the amine compound, the carboxylic acid, the alkoxy metal, and an inorganic acid, etc. are used as the (B) curing catalyst, an amount of use of the (B) curing catalyst is preferably 0.001 to 10 parts by weight, more preferably 0.001 to 5 parts by weight, further preferably 0.001 to 1 part by weight, and particularly preferably 0.001 to 0.5 parts by weight, with respect to 100 parts by weight of the (A) reactive silicon group-containing polymer. When the aminosilane, which is an amino group-containing silane coupling agent, is used as the (B) curing catalyst, the amount of use of the (B) curing catalyst is preferably 0.001 to 10 parts by weight and particularly preferably 0.001 to 5 parts by weight, with respect to 100 parts by weight of the reactive silicon group-containing polymer. An amount of incorporation of the (B) curing catalyst falling within the above-described range enables curing to progress at a sufficiently high rate while maintaining a curing rate at which operation can be easily performed, and achieves satisfactory storage stability of the curing composition.

Generally, the reactive silicon group-containing polymer having a trialkoxysilyl group as the reactive silicon group exhibits satisfactory curability when the organotin compound is used as the (B) curing catalyst, while the curability may be deteriorated when the metal carboxylate, the amine compound, the carboxylic acid, the alkoxy metal, and the inorganic acid, etc. are used as the (B) curing catalyst.

Furthermore, in general, the reactive silicon group-containing polymer having a methoxymethyldimethoxysilyl group as the reactive silicon group exhibits satisfactory curability when the amine compound is used as the (B) curing catalyst, while the curability is deteriorated when using a less amount of the amine compound. Furthermore, when the organotin compound, the carboxylic acid, the alkoxy metal, and the inorganic acid, etc. are used as the (B) curing catalyst, the curability may be deteriorated.

However, in the (A) reactive silicon group-containing polymer which has the reactive silicon group represented by General Formula (1) and in which the atom adjacent to the reactive silicon group has the unsaturated bond, in particular, the (A) reactive silicon group-containing polymer having any of the structures represented by General Formulas (2) to (4), any combination of the reactive silicon group and the (B) curing catalyst is highly active and exhibits satisfactory curability.

<Filler>

Various fillers may be incorporated into the curing composition. Examples of the filler include heavy calcium carbonate, colloidal calcium carbonate, magnesium carbonate, diatomaceous earth, clay, talc, titanium oxide, fumed silica, precipitated silica, crystalline silica, molten silica, silicic anhydride, hydrated silicic acid, carbon black, ferric oxide, aluminum powder, zinc oxide, active zinc oxide, PVC powder, PMMA powder, glass fibers, and filaments.

An amount of use of the filler is preferably 1 to 300 parts by weight, and particularly preferably 10 to 250 parts by weight, with respect to 100 parts by weight of the reactive silicon group-containing polymer.

For the purpose of decreasing weight (density) of the cured product formed using the curing composition, a balloon (hollow filler) such as an organic balloon and an inorganic balloon may be added. The balloon is a spherical filler of which inside is hollow. Examples of a material of the balloon include an inorganic material such as glass, shirasu, and silica, and an organic material such as a phenolic resin, a urea resin, polystyrene, and saran.

An amount of use of the balloon is preferably 0.1 to 100 parts by weight, and particularly preferably 1 to 20 parts by weight, with respect to 100 parts by weight of the reactive silicon group-containing polymer.

<Adhesiveness Imparting Agent>

The adhesiveness imparting agent may be added to the curing composition. A silane coupling agent, a reaction product of the silane coupling agent may be added as the adhesiveness imparting agent.

Specific examples of the silane coupling agent include amino group-containing silanes such as γ-aminopropyltrimethoxysilane, γ-aminopropylmethyldimethoxysilane, N-β-aminoethyl-γ-aminopropyltrimethoxysilane, N-β-aminoethyl-γ-aminopropylmethyldimethoxysilane, N-phenyl-γ-aminopropyltrimethoxysilane, and (2-aminoethyl)aminomethyltrimethoxysilane; isocyanate group-containing silanes such as γ-isocyanatepropyltrimethoxysilane, γ-isocyanatepropyltriethoxysilane, γ-isocyanatepropylmethyldimetboxysilane, α-isocyanatemethyltrimethoxysilane, and α-isocyanatemethyldimethoxymethylsilane; mercapto group-containing silanes such as γ-mercaptopropyltrimethoxysilane, γ-mercaptopropyltriethoxysilane, and γ-mercaptopropylmethyldimethoxysilane; epoxy group-containing silanes such as γ-glycidoxypropyltrimethoxysilane and β-(3,4-epoxycyclohexyl)ethyltrimethoxysilane. Only one kind of the adhesiveness imparting agent may be used, or two or more kinds thereof may be used as a mixture. Furthermore, reaction products of various silane coupling agents may also be used as the adhesiveness imparting agent.

An amount of use of the silane coupling agent is preferably 0.1 to 20 parts by weight, and particularly preferably 0.5 to 10 parts by weight, with respect to 100 parts by weight of the reactive silicon group-containing polymer.

In the curable composition including the (A) reactive silicon group-containing polymer which has the reactive silicon group represented by General Formula (1) and in which the atom adjacent to the reactive silicon group has the unsaturated bond, in particular, the (A) reactive silicon group-containing polymer having any of the structures represented by General Formulas (2) to (4), the amino group-containing silanes (aminosilane) among the above-described silane coupling agents may also be used as the curing catalyst. In this case, the aminosilane is an additive with both functions as the curing catalyst and the adhesiveness imparting agent.

<Plasticizer>

The plasticizer may be added to the curing composition. Specific examples of the plasticizer include a phthalic acid ester compound such as dibutyl phthalate, diisononyl phthalate (DINP), diheptyl phthalate, di(2-ethylhexyl)phthalate, diisodecyl phthalate (DIDP), and butylbenzyl phthalate; a terephthalic acid ester compound such as bis(2-ethylhexyl)-1,4-benzene dicarboxylate; a non-phthalic acid ester compound such as diisononyl 1,2-cyclohexanedicarboxylate; an aliphatic polyhydric carboxylic acid ester compound such as dioctyl adipate, dioctyl sebacate, dibutyl sebacate, diisodecyl succinate, and acetyl tributyl citrate; an unsaturated fatty acid ester compound such as butyl oleate and methyl acetylricinolate; alkylsulfonic acid phenyl ester; a phosphoric acid ester compound; a trimellitic acid ester compound; chlorinated paraffin; a hydrocarbon-based oil such as alkyldiphenyl and partially hydrogenated terphenyl; a processing oil; an epoxy plasticizer such as an epoxidized soybean oil and benzyl epoxystearate, and the like.

A polymeric plasticizer may also be used. Specific examples of the polymeric plasticizer include a vinyl-based polymer; a polyester-based plasticizer; polyethers, for example, polyether polyol having a number average molecular weight of 500 or more such as polyethylene glycol, polypropylene glycol, and the like, derivatives of these polyether polyols in which a hydroxy group is converted into an ester group, an ether group, or the like; polystyrenes; polybutadiene, polybutene, polyisobutylene, butadieneacrylonitrile, and polychloroprene.

An amount of use of the plasticizer is preferably 5 to 150 parts by weight, more preferably 10 to 120 parts by weight, and particularly preferably 20 to 100 parts by weight, with respect to 100 parts by weight of the reactive silicon group-containing polymer. The use of the plasticizer falling within the above-described range makes it easy to obtain a curable composition from which a cured product having excellent mechanical strength can be formed while providing the desired effect as the plasticizer. The plasticizer may be used singly, or two or more kinds thereof may be used in combination.

<Anti-Sagging Agent>

For the purpose of preventing sagging and improving workability, the anti-sagging agent may be added to the curing composition, as necessary. The anti-sagging agent is not particularly limited. Examples of the anti-sagging agent include polyamide waxes; hydrogenated castor oil derivatives; metallic soaps such as calcium stearate, aluminum stearate, and barium stearate. The anti-sagging agent may be used singly, or two or more kinds thereof may be used in combination.

An amount of use of the anti-sagging agent is preferably 0.1 to 20 parts by weight, with respect to 100 parts by weight of the reactive silicon group-containing polymer.

<Antioxidant>

The antioxidant (age resister) may be used for the curing composition. The antioxidant can be used to increase weather resistance of the cured product. As the antioxidant, a hindered phenolic system, a monophenolic system, a bisphenolic system, and a polyphenolic system may be exemplified. Specific examples of the antioxidant are described in, for example, Japanese Unexamined Patent Application, Publication Nos. H04-283259 and H09-194731.

An amount of use of the antioxidant is preferably 0.1 to 10 parts by weight, and particularly preferably 0.2 to 5 parts by weight, with respect to 100 parts by weight of the reactive silicon group-containing polymer.

<Photostabilizer>

The photostabilizer may be used for the curing composition. The photostabilizer can be used to prevent photooxidative degradation of the cured product. As the photostabilizer, a benzotriazole system, a hindered amine system, and a benzoate-based compound, etc. may be exemplified. The hindered amine system is a particularly preferred photostabilizer.

An amount of use of the photostabilizer is preferably 0.1 to 10 parts by weight, and particularly preferably 0.2 to 5 parts by weight, with respect to 100 parts by weight of the reactive silicon group-containing polymer.

<Ultraviolet Absorber>

The ultraviolet absorber may be used for the curing composition. The ultraviolet absorber can be used to increase weather resistance on a surface of the cured product. As the ultraviolet absorber, a benzophenone system, a benzotriazole system, a salicylate system, a substituted tolyl system, and a metal chelate-based compound may be exemplified. The benzotriazole system is a particularly preferred ultraviolet absorber. Suitable specific examples of the benzotriazole system ultraviolet absorber include those sold under the trade names TINUVIN P, TINUVIN 213, TINUVIN 234, TINUVIN 326, TINUVIN 327, TINUVIN 328, TINUVIN 329, and TINUVIN 571 (all manufactured by BASF).

An amount of use of the ultraviolet absorber is preferably 0.1 to 10 parts by weight, and particularly preferably 0.2 to 5 parts by weight, with respect to 100 parts by weight of the reactive silicon group-containing polymer.

<Physical Property-Adjusting Agent>

The physical property-adjusting agent may be added to the curable composition for adjusting a tensile property of the cured product produced therefrom, as necessary. The physical property-adjusting agent is not particularly limited. Examples of the physical property-adjusting agent include alkylalkoxysilanes such as phenoxytrimethylsilane, methyltrimethoxysilane, dimethyldimethoxysilane, trimethylmethoxysilane, and n-propyltrimethoxysilane; arylalkoxysilanes such as diphenyldimethoxysilane and phenyltrimethoxysilane; alkylisopropenoxysilane such as dimethyldiisopropenoxysilane, methyltriisopropenoxysilane, and γ-glycidoxypropylmethyldiisopropenoxysilane; trialkylsilylborates such as tris(trimethylsilyl)borate and tris(triethylsilyl)borate; silicone varnish; polysiloxanes, and the like. The physical property-adjusting agent can be used to increase hardness, or, conversely, decrease hardness to produce elongation at break of the cured product of the curable composition. The physical property-adjusting agent may be used singly, or two or more kinds thereof may be used in combination.

In particular, a compound from which a compound having a monovalent silanol group in a molecule is produced through hydrolysis has an action of decreasing a modulus of the cured product without deteriorating surface tackiness of the cured product. A compound from which trimethylsilanol is produced is particularly preferred. Examples of the compound from which a compound having a monovalent silanol group in a molecule is produced through hydrolysis include a silicon compound from which silane monool is produced through hydrolysis, which is a derivative of alcohol such as hexanol, octanol, phenol, trimethylolpropane, glycerin, pentaerythritol, and sorbitol.

An amount of use of the physical property-adjusting agent is preferably 0.1 to 10 parts by weight, and particularly preferably 0.5 to 5 parts by weight, with respect to 100 parts by weight of the reactive silicon group-containing polymer.

<Epoxy Group-Containing Compound>

The epoxy group-containing compound may be used in the curable composition. The epoxy group-containing compound can be used to increase resiliency of the cured product. As the epoxy group-containing compound, epoxidized unsaturated oils, epoxidized unsaturated fatty acid esters, alicyclic epoxy compounds, and compounds represented by epichlorohydrin derivatives, and mixtures thereof may be exemplified. Specific examples thereof include an epoxidized soybean oil, an epoxidized linseed oil, bis(2-ethylhexyl)-4,5-epoxycyclohexan-1,2-dicarboxylate (E-PS), epoxyoctyl stearate, and epoxybutyl stearate.

An amount of use of the epoxy compound is preferably 0.5 to 50 parts by weight, with respect to 100 parts by weight of the reactive silicon group-containing polymer.

<Photocurable Material>

The photocurable material may be used for the curing composition. The photocurable material can be used to form a film of the photocurable material on a surface of the cured product to thereby improve tackiness and weather resistance of the cured product. Many materials such as organic monomers, oligomers, resins, or compositions containing them are known as this kind of material. As representative photocurable materials, an unsaturated acrylic system compound, which is a monomer, oligomer, or mixtures thereof having one or several acrylic-based or methacrylic-based unsaturated groups; poly(vinyl cinnamate); or an azide resin can be used.

An amount of use of the photocurable material is preferably 0.1 to 20 parts by weight, and more preferably 0.5 to 10 parts by weight, with respect to 100 parts by weight of the reactive silicon group-containing polymer. The use of the photocurable material falling within the above-described range makes it easy to obtain a curable composition from which a cured product having excellent weather resistance, being flexible, and being difficult to crack can be formed.

<Oxygen-Curable Material>

The oxygen-curable material may be used for the curing composition. As the oxygen-curable material, an unsaturated compound which can react with oxygen in the air may be exemplified. The oxygen-curable material is reacted with oxygen in the air to thereby form a cured film in the vicinity of a surface of the cured product, resulting in actions of, for example, preventing the surface from being tacky and dirt or dust from adhering onto the surface of the cured product.

Specific examples of the oxygen-curable material include a drying oil as represented by a tung oil and a linseed oil, and various alkyd resins that are obtained by modifying the compound; those obtained by modifying a resin such as an acryl-based polymer, an epoxy-based resin, and a silicon resin with the drying oil; a liquid polymer such as 1,2-polybutadiene, 1,4-polybutadiene, and a C5 to C8 diene polymer obtained by polymerizing or copolymerizing a diene-based compound such as butadiene, chloroprene, isoprene, and 1,3-pentadiene, and the like. These may be used singly, or two or more kinds thereof may be used in combination.

An amount of use of the oxygen-curable material is preferably 0.1 to 20 parts by weight, and more preferably 0.5 to 10 parts by weight, with respect to 100 parts by weight of the reactive silicon group-containing polymer. The amount of use of the oxygen-curable material falling within the above-described range makes it easy to obtain a sufficient contamination-improving effect and difficult to impair, for example, a tensile property of the cured product. As described in Japanese Unexamined Patent Application, Publication No. H03-160053, the oxygen-curable material is preferably used in combination with the photocurable material.

<<Preparation of Curable Compositions>>

The above-described curable composition can be prepared as one-component type of which components are all combined in advance, sealed, and stored and which is cured with moisture in the air after construction. Furthermore, the curable composition can also be prepared as two-component type which includes a combined material, serving as a curing agent, and a polymer composition to be mixed with each other before use, the combined material being prepared separately from the polymer composition by combining components such as the (B) curing catalyst, the filler, the plasticizer, and water. From the viewpoint of workability, the one-component type is preferred.

In the case of the one-component type curable composition, since components thereof are all combined in advance, it is preferable that a moisture-containing component be previously dehydrated and dried before use or dehydrated under reduced pressure during combining and kneading. Furthermore, in addition to the dehydration and drying method, addition of, as a dehydrating agent, a silicon compound which may be reactive with water such as n-propyltrimethoxysilane, vinyltrimethoxysilane, vinylmethyldimethoxysilane, γ-mercaptopropylmethyldimethoxysilane, γ-mercaptopropylmethyldiethoxysilane, and γ-glycidoxypropyltrimethoxysilane further improves storage stability.

An amount of use of the dehydrating agent, in particular, the silicon compound which may be reactive with water such as vinyltrimethoxysilane is preferably 0.1 to 20 parts by weight and more preferably 0.5 to 10 parts by weight, with respect to 100 parts by weight of the reactive silicon group-containing polymer.

<<Method for Producing Cured Product>>

The above-described curable composition is shaped into the desired shape prior to curing, by means of a method such as application, casting, or filling. The curable composition which has been shaped into the desired shape through application, casting, or filling is cured under the desired environment, for example, normal temperature and normal humidity. The above-described curable composition including the (A) reactive silicon group-containing polymer which has the reactive silicon group represented by General Formula (1) and in which the atom adjacent to the reactive silicon group has the unsaturated bond, in particular, the (A) reactive silicon group-containing polymer having any of the structures represented by General Formulas (2) to (4) is able to be cured in a much shorter time than that for a curable composition including a conventionally known reactive silicon group-containing polymer.

<<Application>>

The above-described curable composition can be used for a sticker; a sealing material for sealing work on buildings, ships, automobiles, roads, or the like; a molding agent; an adhesive; paint; and a spraying agent. Furthermore, the cured product of the above-described curable composition is suitably used as, for example, a waterproofing material, a coating film waterproofing material, a vibration-proofing material, a damping material, an acoustic insulating material, and a foamed material. Since the cured product obtained by curing the curable composition has excellent flexibility and adhesiveness, the curable composition is more preferably used as the sealing material or the adhesive, among the above-described applications.

EXAMPLES

One or more embodiments will now be specifically described with reference to Examples. One or more embodiments are not limited to Examples in any way.

A number average molecular weight in Examples is a GPC molecular weight measured under the following conditions.

Liquid feeding system: HLC-8120GPC manufactured by Tosoh Corporation.
Column: TSK-GEL H type manufactured by Tosoh Corporation.
Solvent: THE
Molecular weight: in terms of polystyrene
Measurement temperature: 40° C.

An end group-based molecular weight in Examples is a molecular weight determined using a hydroxyl value determined by the measurement method according to JIS K 1557 and an iodine value determined by the measurement method according to JIS K 0070, in view of the structure of an organic polymer (the degree of branching determined by a polymerization initiator used).

An average introduction number of carbon-carbon unsaturated bonds per end of a polymer (Q) described in Examples was calculated according to the following expression:

(Average introduction number)=[Iodine value of Polymer (Q)–Iodine value of Polymer precursor (P)]/[Hydroxyl value of Polymer precursor (P)].

An average introduction number of silyl groups per end of polymers (A) and (B) described in Examples was calculated by NMR measurement.

Synthesis Example 1

Propylene oxide was polymerized using polyoxypropylene glycol having a number average molecular weight of about 2,000, serving as an initiator, and a zinc hexacyanocobaltate-glyme complex catalyst to thereby obtain polyoxypropylene (P-I) having hydroxyl groups at both ends and having a number average molecular weight of 27,900 (end group-based molecular weight: 17,700) and a molecular weight distribution Mw/Mn of 1.21. To the hydroxyl groups in the resultant hydroxyl group-terminated polyoxypropylene (P-I), was added 1.05 mol equivalents of sodium methoxide as a 28% methanol solution. The methanol was distilled off by vacuum devolatilization, and then 1.16 mol equivalents of propargyl bromide was further added to the hydroxyl groups in the polymer (P-I) to thereby convert the terminal hydroxyl groups into propargyl groups. Unreacted propargyl bromide was removed by devolatilization under reduced pressure. The resultant crude propargyl group-terminated polyoxypropylene was mixed and stirred with n-hexane and water, and then the water was removed by centrifugation and the hexane was devolatilized under reduced pressure from the resultant hexane solution to thereby remove a metal salt in the polymer. Thus, polyoxypropylene (Q-I) having propargyl groups at end sites was obtained. To 500 g of the polymer (Q-I), were added 150 µL of a platinum-divinyldisiloxane complex (3 wt % isopropanol solution in terms of platinum) and 7.5 g of dimethoxymethylsilane, to thereby effect a hydrosilylation reaction. After reacting at 90° C. for 2 hours, unreacted dimethoxymethylsilane was distilled off under reduced pressure to thereby obtain polyoxypropylene (A-I) having dimethoxymethylsilyl groups at ends and having a number average molecular weight of 28,500. The polymer (A-I) was found to have on average 1.0 dimethoxymethylsilyl group per end and on average 2.0 dimethoxymethylsilyl groups per molecule.

Synthesis Example 2

To the hydroxyl groups in the hydroxyl group-terminated polyoxypropylene (P-I) obtained from Synthesis Example 1, was added 1.2 mol equivalents of sodium methoxide as a 28% methanol solution. The methanol was distilled off by vacuum devolatilization, and then 1.5 mol equivalents of allyl chloride was further added to hydroxyl groups in a polymer (P-I) to thereby convert the terminal hydroxyl groups into allyl groups. Hereafter, purification manipulation was performed in the same manner as in Synthesis Example 1. Thus, polyoxypropylene (Q-II) having allyl groups at end sites was obtained. To 500 g of the polymer (Q-II), were added 150 µL of a platinum-divinyldisiloxane complex (3 wt % isopropanol solution in terms of platinum) and 4.8 g of dimethoxymethylsilane, to thereby effect a hydrosilylation reaction. After reacting at 90° C. for 2 hours, unreacted dimethoxymethylsilane was distilled off under reduced pressure to thereby obtain polyoxypropylene (B-II) having dimethoxymethylsilyl groups at ends and having a number average molecular weight of 28,500. The polymer (B-II) was found to have on average 0.8 dimethoxymethylsilyl group per end and on average 1.6 dimethoxymethylsilyl groups per molecule.

Synthesis Example 3

To the hydroxyl groups in the hydroxyl group-terminated polyoxypropylene (P-I) obtained from Synthesis Example 1, was added 1.0 mol equivalent of sodium methoxide as a 28% methanol solution. The methanol was distilled off by vacuum devolatilization, and then 1.0 mol equivalent of allyl glycidyl ether was added to the hydroxyl groups in the polymer (P-I) to thereby allow them to react. Thereafter, 0.28 mol equivalents of a sodium methoxide solution in methanol was added thereto, methanol was removed, and 1.79 mol equivalents of allyl chloride was further added thereto to thereby convert the terminal hydroxyl groups into allyl groups. Hereafter, purification manipulation was performed in the same manner as in Synthesis Example 1. Thus, polyoxypropylene (Q-III) having two or more carbon-carbon unsaturated bonds at an end structure thereof was obtained. In the polymer (Q-III), it was found that on average 2.0 carbon-carbon unsaturated bonds per end site were introduced. To 500 g of the resultant polyoxypropylene (Q-III) having on average 2.0 carbon-carbon unsaturated bonds per end site, were added 150 µL of a platinum-divinyldisiloxane complex (3 wt % isopropanol solution in terms of platinum) and 9.6 g of dimethoxymethylsilane, to thereby effect a hydrosilylation reaction. After reacting at 90° C. for 2 hours, unreacted dimethoxymethylsilane was distilled off under reduced pressure to thereby obtain polyoxypropylene (B-II) having two or more dimethoxymethylsilyl groups at an end structure thereof and having a number average molecular weight of about 28,500. The polymer (B-II) was found to have on average 1.7 dimethoxymethylsilyl group per end and on average 3.4 dimethoxymethylsilyl groups per molecule.

Example 1, and Comparative Examples 1 to 2

One hundred parts by weight of the polymer (A-I), (B-I), or (B-II) described in Table 1 was mixed with 55 parts by weight of DINP (manufactured by J-PLUS Co., Ltd.: diisononyl phthalate), 120 parts by weight of HAKUENKA CCR (manufactured by SHIRAISHI CALCIUM KAISHA, LTD.: precipitated calcium carbonate), 20 parts by weight of TIPAQUE R820 (manufactured by ISHIHARA SANGYO KAISHA, LTD.: titanium oxide), 2 parts by weight of DISPARLON 6500 (manufactured by Kusumoto Chemicals, Ltd.: fatty acid amide wax), 1 part by weight of TINUVIN 770 (manufactured by BASF: bis(2,2,6,6-tetramethyl-4-piperidyl) sebacate), and 1 part by weight of TINUVIN 326 (manufactured by BASF: 2-(3-tert-butyl-2-hydroxy-5-methylphenyl)-5-chlorobenzotriazole), uniformly dispersed with three rolls, and dehydrated under reduced pressure at 120° C. for 2 hours. Thereafter, the resultant was cooled to 50° C., and then added and mixed with 2 parts by weight of A-171

(manufactured by Momentive: vinyltrimethoxysilane), 3 parts by weight of A-1120 (manufactured by Momentive: N-(β-aminoethyl)-γ-aminopropyltrimethoxysilane), and 2 parts by weight of U-220H (manufactured by Nitto Kasei Co., Ltd.: dibutyltin bisacetylacetonate), and then sealed in a damp-proof cartridge under a condition substantially free from moisture.

(Dumbbell Tensile Physical Property)

The resultant composition was filled into a mold and cured at 23° C. and 50% RH for 3 days and further at 50° C. for 4 days to thereby produce a sheet-shaped cured product having a thickness of about 3 mm. The sheet-shaped cured product was punched out into the Dumbbell type No. 3, which was subjected to a tensile strength test at 23° C. and 50% RH to thereby measure a modulus at 100% elongation and a strength and elongation at break. The measurement was performed at a tension rate of 200 mm/min with AUTOGRAPH (AGS-J, manufactured by SHIMADZU CORPORATION). The results are presented in Table 1.

(Tear Strength)

The resultant composition was filled into a mold and cured at 23° C. and 50% RH for 3 days and further at 50° C. for 4 days to thereby produce a sheet-shaped cured product having a thickness of about 3 mm. The sheet-shaped cured product was punched out into the Dumbbell (JIS A type) for the tear strength, which was subjected to a tear test at 23° C. and 50% RH. The measurement was performed at a tension rate of 200 mm/min with AUTOGRAPH (AGS-J, manufactured by SHIMADZU CORPORATION). The results are presented in Table 1.

TABLE 1

| Composition (Parts by weight) | | | Ex. 1 | Comp. Ex. 1 | Comp. Ex. 2 |
|---|---|---|---|---|---|
| Polymer | A-I | | 100 | — | — |
| | B-I | | — | 100 | — |
| | B-II | | — | — | 100 |
| Plasticizer | DINP | | 55 | 55 | 55 |
| Calcium Carbonate | CCR | | 120 | 120 | 120 |
| Titanium Oxide | TIPAQUE R820 | | 20 | 20 | 20 |
| Anti-sagging agent | DISPARLON 6500 | | 2 | 2 | 2 |
| Photostabilizer | TINUVIN 770 | | 1 | 1 | 1 |
| Ultraviolet absorber | TINUVIN 326 | | 1 | 1 | 1 |
| Dehydrating agent | A-71 | | 2 | 2 | 2 |
| Adhesiveness imparting agent | A-120 | | 3 | 3 | 3 |
| Condensation catalyst | U-20H | | 2 | 2 | 2 |
| Dumbbell tensile physical property | M50 | MPa | 0.37 | 0.28 | 0.59 |
| | M100 | MPa | 0.59 | 0.45 | 0.88 |
| | TB | MPa | 3.69 | 3.09 | 3.14 |
| | EB | % | 1104 | 1133 | 676 |
| Tear strength | TB | MPa | 19.2 | 16.2 | 14.7 |

The curable composition of Example 1 including the reactive silicon group-containing polymer (A-I) of which end groups have structure meeting the predetermined requirements described above is more excellent in strength (TB) of the resultant cured product than the curable composition including the reactive silicon group-containing polymer (B-I) in which an atom adjacent to a silicon group does not have an unsaturated bond and which has on average no more than 0.8 reactive silicon groups per end. Furthermore, the curable composition of Example 1 including the reactive silicon group-containing polymer (A-I) is more excellent in flexibility (low modulus and high elongation) and strength (TB) of the resultant cured product than the curable composition including the reactive silicon group-containing polymer (B-II) in which an atom adjacent to a silicon group does not have an unsaturated bond and which has on average more than 1.0 reactive silicon group per end.

Synthesis Example 4

To 500 g of the polymer (Q-I) obtained in Synthesis Example 1, were added 150 μL of a platinum-divinyldisiloxane complex (3 wt % isopropanol solution in terms of platinum) and 10.34 g of methoxymethyldimethoxysilane, to thereby effect a hydrosilylation reaction. After reacting at 90° C. for 2 hours, unreacted methoxymethyldimethoxysilane was distilled off under reduced pressure to thereby obtain polyoxypropylene (A-1) having methoxymethyldimethoxysilyl groups at ends and having a number average molecular weight of 28,500. The polymer (A-1) was found to have on average 2.0 methoxymethyldimethoxysilyl groups per molecule.

Synthesis Example 5

Propylene oxide was polymerized using polyoxypropylene triol having a number average molecular weight of about 3,000, serving as an initiator, and a zinc hexacyanocobaltate-glyme complex catalyst to thereby obtain polyoxypropylene (P-1) having hydroxyl groups at ends and having a number average molecular weight of 24,600 (end group-based molecular weight: 17,400) and a molecular weight distribution Mw/Mn of 1.31. To the hydroxyl groups in the resultant hydroxyl group-terminated polyoxypropylene (P-1), was added 1.05 mol equivalents of sodium methoxide as a 28% methanol solution. The methanol was distilled off by vacuum devolatilization, and then 1.16 mol equivalents of propargyl bromide was further added to the hydroxyl groups in the polymer (P-1) to thereby convert the terminal hydroxyl groups into propargyl groups. Unreacted propargyl bromide was removed by devolatilization under reduced pressure. The resultant crude propargyl group-terminated polyoxypropylene was mixed and stirred with n-hexane and water, and then the water was removed by centrifugation and the hexane was devolatilized under reduced pressure from the resultant hexane solution to thereby remove a metal salt in the polymer. Thus, polyoxypropylene (Q-1) having propargyl groups at end sites was obtained. To 500 g of the polymer (Q-1), were added 150 μL of a platinum-divinyldisiloxane complex (3 wt % isopropanol solution in terms of platinum) and 11.49 g of methoxymethyldimethoxysilane, to thereby effect a hydrosilylation reaction. After reacting at 90° C. for 2 hours, unreacted methoxymethyldimethoxysilane was distilled off under reduced pressure to thereby obtain polyoxypropylene (A-2) having methoxymethyldimethoxysilyl groups at ends and having a number average molecular weight of 26,200. The polymer (A-2) was found to have on average 3.0 methoxymethyldimethoxysilyl groups per molecule.

Synthesis Example 6

To 500 g of the polymer (Q-I) obtained in Synthesis Example 1, were added 150 μL of a platinum-divinyldisiloxane complex (3 wt % isopropanol solution in terms of platinum) and 8.37 g of trimethoxysilane, to thereby effect a hydrosilylation reaction. After reacting at 90° C. for 2 hours, unreacted trimethoxysilane was distilled off under reduced pressure to thereby obtain polyoxypropylene (A-3) having trimethoxysilyl groups at ends and having a number average molecular weight of 28,500. The polymer (A-3) was found to have on average 2.0 trimethoxysilyl groups per molecule.

Synthesis Example 7

To the hydroxyl groups in the hydroxyl group-terminated polyoxypropylene (P-I) obtained in Synthesis Example 1, was added 1.2 mol equivalents of sodium methoxide as a 28% methanol solution. The methanol was distilled off by vacuum devolatilization, and then 1.5 mol equivalents of allyl chloride was further added to the hydroxyl groups in the polymer (P-I) to thereby convert the terminal hydroxyl groups into allyl groups. Unreacted allyl chloride was removed by devolatilization under reduced pressure. The resultant crude allyl group-terminated polyoxypropylene was mixed and stirred with n-hexane and water, and then the water was removed by centrifugation and the hexane was devolatilized under reduced pressure from the resultant hexane solution to thereby remove a metal salt in the polymer. Thus, a polyoxypropylene polymer (Q-2) having allyl groups at end sites was obtained. To 500 g of the polymer (Q-2), were added 150 μL of a platinum-divinyldisiloxane complex (3 wt % isopropanol solution in terms of platinum) and 6.5 g of methoxymethyldimethoxysilane, to thereby effect a hydrosilylation reaction. After reacting at 90° C. for 2 hours, unreacted methoxymethyldimethoxysilane was distilled off under reduced pressure to thereby obtain polyoxypropylene (E-1) having methoxymethyldimethoxysilyl groups at ends and having a number average molecular weight of about 28,200. The polymer (E-1) was found to have on average 1.6 methoxymethyldimethoxysilyl groups per molecule.

Synthesis Example 8

To 500 g of the polymer (Q-2) obtained in Synthesis Example 7, were added 150 μL of a platinum-divinyldisiloxane complex (3 wt % isopropanol solution in terms of platinum) and 5.5 g of trimethoxysilane, to thereby effect a hydrosilylation reaction. After the mixed solution was reacted at 90° C. for 2 hours, unreacted trimethoxysilane was distilled off under reduced pressure to thereby obtain polyoxypropylene (E-2) having trimethoxysilyl groups at ends and having a number average molecular weight of 28,500. The polymer (E-2) was found to have on average 1.6 trimethoxysilyl groups per molecule.

Synthesis Example 9

To 500 g of the polymer (Q-2) obtained in Synthesis Example 5, were added 150 μL of a platinum-divinyldisiloxane complex (3 wt % isopropanol solution in terms of platinum) and 4.8 g of dimethoxymethylsilane, to thereby effect a hydrosilylation reaction. After reacting at 90° C. for 2 hours, unreacted dimethoxymethylsilane was distilled off under reduced pressure to thereby obtain polyoxypropylene (E-3) having dimethoxymethylsilyl groups at ends and having a number average molecular weight of 28,500. The polymer (E-3) was found to have on average 1.6 dimethoxymethylsilyl groups per molecule.

Examples 2 to 16, Comparative Examples 3 to 10

The polymers described in Synthesis Examples 1 to 7 and commercial products were used according to formulas presented in Tables 2 to 4 to examine for their curability. Each of the polymers weighed into a minicup was added with a condensation catalyst, kneaded and stirred together, and left to stand under a constant temperature and constant humidity condition of 23° C. and 50% RH. This time point was determined as a curing initiating time. A surface of the mixture was touched with a spatula every 1 minute for the first 20 minutes and then every 10 minutes, and the time taken until the mixture no longer adhered to the spatula was measured as a skinning time. The results are presented in Tables 2 to 4.

The following condensation catalysts were used in Examples 2 to 16 and Comparative Examples 3 to 10.
DBU: 1,8-diazabicyclo[5,4,0]undecene-7 (manufactured by Tokyo Chemical Industry Co., Ltd.)
PhGu: 45% 1-phenylguanidine solution in N-n-butylbenzenesulfonamide (manufactured by NIPPON CARBIDE INDUSTRIES CO., INC.)
VA/DEAPA: versatic acid/3-diethylaminopropylamine=2.5/0.5
U-810: NEOSTANN U-810 (manufactured by Nitto Kasei Co., Ltd.)
A-1120: N-(β-aminoethyl)-γ-aminopropyltrimethoxysilane (manufactured by Momentive)

In Comparative Examples 10, the following polymer that is a reaction product of hydroxyl group-terminated polyether and (dimethoxymethylsilyl)methylisocyanate was used.
STP-E30: GENIPSIL STP-E30 (manufactured by Wacker)

TABLE 2

| Polymer | | Ex. | | | | | | | | | | | | Comp. Ex, | | |
|---|---|---|---|---|---|---|---|---|---|---|---|---|---|---|---|---|
| (composition ratio) | | 2 | 3 | 4 | 5 | 6 | 7 | 8 | 9 | 10 | 11 | 12 | 13 | 3 | 4 | 5 |
| Polymer | A-1 | 100 | 100 | 100 | 100 | | | | | | 50 | | | | | |
| | A-2 | | | | | 100 | | | | | | | | | | |
| | A-3 | | | | | | 100 | 100 | 100 | 100 | | 50 | 50 | | | |
| | E-1 | | | | | | | | | | | | 50 | 100 | | 50 |
| | E-2 | | | | | | | | | 50 | 50 | | | | 100 | 50 |
| Condensation catalyst | DBU | 0.2 | 0.1 | | | 0.2 | 0.2 | 0.1 | | | 0.2 | 0.2 | 0.2 | 0.2 | 0.2 | 0.2 |
| | PhGu | | | 0.2 | | | | | 0.2 | | | | | | | |
| | VA/DEAPA | | | | 1.0 | | | | | 1.0 | | | | | | |
| Curability | Skinning time (min.) | 5 | 8 | 7 | 12 | 1.5 | 10 | 17 | 19 | 13 | 8 | 13 | 16 | 56 | 166 | 82 |

TABLE 3

| Polymer (composition ratio) | | Ex. 14 | Comp. Ex. 6 | Comp. Ex. 7 |
|---|---|---|---|---|
| Polymer | A-3 | 100 | | |
| | E-1 | | 100 | |
| | E-2 | | | 100 |
| Condensation catalyst | U-810 | 1 | 1 | 1 |
| Curability | Skinning time (min.) | 34 | 156 | 116 |

TABLE 4

| Polymer (composition ratio) | | Ex. 15 | Ex. 16 | Comp. Ex. 8 | Comp. Ex. 9 | Comp. Ex. 10 |
|---|---|---|---|---|---|---|
| Polymer | A-1 | 100 | | | | |
| | A-2 | | 100 | | | |
| | E-1 | | | 100 | | |
| | E-2 | | | | 100 | |
| | STP-E10 | | | | | 100 |
| Silane coupling agent | A-1120 | 3.0 | 3.0 | 3.0 | 3.0 | 3.0 |
| Curability | Skinning time (min.) | 66 | 37 | Uncured | Uncured | 73 |

As is clear from Tables 2 to 4, the curable compositions including the reactive silicon group-containing polymer (A-1), (A-2), or (A-3) which had the reactive silicon group represented by General Formula (1) and in which the atom adjacent to the reactive silicon group had the unsaturated bond exhibited more rapid curability using any condensation catalyst as compared with the curable composition including the organic polymer (E-1) or (E-2), which did not correspond to the reactive silicon group-containing polymer which had the reactive silicon group represented by General Formula (1) and in which the atom adjacent to the reactive silicon group had the unsaturated bond, or a commercially available organic polymer STP-E10. Furthermore, when using a condensation catalyst having a very low activity such as aminosilane, Comparative organic polymer (E-1) or (E-2) had an insufficient activity and was uncured, while the curable composition including the organic polymer (A-1) or (A-2) exhibited satisfactory curability. Moreover, the curable composition including the organic polymer (A-1) or (A-2) also exhibited more rapid curability as compared with the curable composition including the commercially available organic polymer STP-E10.

Examples 17, 18, Comparative Example 11

One hundred parts by weight of the polymer of a kind described in Table 5 was mixed with 55 parts by weight of DINP (manufactured by J-PLUS Co., Ltd.: diisononyl phthalate), 120 parts by weight of HAKUENKA CCR (manufactured by SHIRAISHI CALCIUM KAISHA, LTD.: precipitated calcium carbonate), 20 parts by weight of TIPAQUE R820 (manufactured by ISHIHARA SANGYO KAISHA, LTD.: titanium oxide), 2 parts by weight of DISPARLON 6500 (manufactured by Kusumoto Chemicals, Ltd.: fatty acid amide wax), 1 part by weight of TINUVIN 770 (manufactured by BASF: bis(2,2,6,6-tetramethyl-4-piperidyl) sebacate), and 1 part by weight of TINUVIN 326 (manufactured by BASF: 2-(3-tert-butyl-2-hydroxy-5-methylphenyl)-5-chlorobenzotriazole), uniformly dispersed with three rolls, and dehydrated under reduced pressure at 120° C. for 2 hours. Thereafter, the resultant was cooled to 50° C., and then added and mixed with 2 parts by weight of A-171 (manufactured by Momentive: vinyltrimethoxysilane), 3 parts by weight of A-1120 (manufactured by Momentive: N-(β-aminoethyl)-γ-aminopropyltrimethoxysilane), and 0.3 parts by weight of DBU (1,8-diazabicyclo[5,4,0]undecene-7), and then sealed in a damp-proof cartridge under a condition substantially free from moisture.

Examples 19, 20, Comparative Example 12

One hundred parts by weight of the polymer of a kind described in Table 5 was mixed with 55 parts by weight of DINP (manufactured by J-PLUS Co., Ltd.: diisononyl phthalate), 120 parts by weight of HAKUENKA CCR (manufactured by SHIRAISHI CALCIUM KAISHA, LTD.: precipitated calcium carbonate), 20 parts by weight of TIPAQUE R820 (manufactured by ISHIHARA SANGYO KAISHA, LTD.: titanium oxide), 2 parts by weight of DISPARLON 6500 (manufactured by Kusumoto Chemicals, Ltd.: fatty acid amide wax), 1 part by weight of TINUVIN 770 (manufactured by BASF: bis(2,2,6,6-tetramethyl-4-piperidyl) sebacate), and 1 part by weight of TINUVIN 326 (manufactured by BASF: 2-(3-tert-butyl-2-hydroxy-5-methylphenyl)-5-chlorobenzotriazole), uniformly dispersed with three rolls, and dehydrated under reduced pressure at 120° C. for 2 hours. Thereafter, the resultant was cooled to 50° C., and then added and mixed with 3 parts by weight of A-1120 (manufactured by Momentive: N-(β-aminoethyl)-γ-aminopropyltrimethoxysilane), and then sealed in a damp-proof cartridge under a condition substantially free from moisture.

(Skinning Time)

The resultant composition was filled into a mold having a thickness of about 5 mm using a spatula and the time at which the surface thereof became flat was determined to be a curing initiating time. The surface was touched with the spatula, and the time taken until a composition to be evaluated no longer adhered to the spatula was measured as a skinning time. The results are presented in Table 5.

(Dumbbell Tensile Physical Property)

The dumbbell tensile physical property was measured in the same manner as in Example 1. The results are presented in Table 5.

TABLE 5

| Composition | | Ex. 17 | Ex. 18 | Comp. Ex. 11 | Ex. 19 | Ex. 20 | Comp. Ex. 12 |
|---|---|---|---|---|---|---|---|
| Polymer | A-1 | 100 | | | 100 | | |
| | A-3 | | 100 | | | 100 | |
| | E-1 | | | 100 | | | 100 |
| Plasticizer | DINP | 55 | 55 | 55 | 55 | 55 | 55 |
| Calcium carbonate | CCR | 120 | 120 | 120 | 120 | 120 | 120 |
| Titanium oxide | TIPAQUE R820 | 20 | 20 | 20 | 20 | 20 | 20 |
| Ant-sagging agent | DISPARLON 6500 | 2 | 2 | 2 | 2 | 2 | 2 |
| Photostabilizer | TINUVIN 770 | 1 | 1 | 1 | 1 | 1 | 1 |
| Ultraviolet absorber | TINUVIN 326 | 1 | 1 | 1 | 1 | 1 | 1 |
| Dehydrating agent | A-171 | 2 | 2 | 2 | | | |
| Adhesiveness imparting agent | A-1120 | 3 | 3 | 3 | 3 | 3 | 3 |
| Condensation catalyst | DBU | 0.3 | 0.3 | 0.3 | | | |
| Curability | Skinning time (min.) | 15 | 16 | 111 | 66 | 148 | Uncured |
| Dumbbell tensile physical property | M50 MPa | 0.37 | 0.43 | 0.28 | 0.43 | 0.46 | 0.43 |
| | M100 MPa | 0.60 | 0.72 | 0.46 | 0.72 | 0.82 | 0.72 |
| | TB MPa | 2.35 | 2.16 | 2.14 | 2.38 | 2.18 | 2.38 |
| | EB % | 803 | 501 | 900 | 655 | 440 | 655 |

As is clear from Table 5, in the case where a non-tin condensation catalyst such as DBU is used in a small amount or is not used, the curable composition including the organic polymer (A-1) or (A-3) exhibited more satisfactory curability as compared with the curable composition including the organic polymer (E-1).

Example 21, Comparative Example 13

One hundred parts by weight of the polymer of a kind described in Table 6 was mixed with 55 parts by weight of DINP (manufactured by J-PLUS Co., Ltd.: diisononyl phthalate), 120 parts by weight of HAKUENKA CCR (manufactured by SHIRAISHI CALCIUM KAISHA, LTD.: precipitated calcium carbonate), 20 parts by weight of TIPAQUE R820 (manufactured by ISHIHARA SANGYO KAISHA, LTD.: titanium oxide), 2 parts by weight of DISPARLON 6500 (manufactured by Kusumoto Chemicals, Ltd.: fatty acid amide wax), 1 part by weight of TINUVIN 770 (manufactured by BASF: bis(2,2,6,6-tetramethyl-4-piperidyl)sebacate), and 1 part by weight of TINUVIN 326 (manufactured by BASF: 2-(3-tert-butyl-2-hydroxy-5-methylphenyl)-5-chlorobenzotriasole), uniformly dispersed with three rolls, and dehydrated under reduced pressure at 120° C. for 2 hours. Thereafter, the resultant was cooled to 50° C., and then added and mixed with 2 parts by weight of A-171 (manufactured by Momentive: vinyltrimethoxysilane), 3 parts by weight of A-1120 (manufactured by Momentive: N-(β-aminoethyl)-γ-aminopropyltrimethoxysilane), and 2 parts by weight of U-220H (dibutyltin diacetylacetonate), and then sealed in a damp-proof cartridge under a condition substantially free from moisture.

Examples 22, Comparative Example 14

One hundred parts by weight of the polymer of a kind described in Table 6 was mixed with 55 parts by weight of DINP (manufactured by J-PLUS Co., Ltd.: diisononyl phthalate), 120 parts by weight of HAKUENKA CCR (manufactured by SHIRAISHI CALCIUM KAISHA, LTD.: precipitated calcium carbonate), 20 parts by weight of TIPAQUE R820 (manufactured by ISHIHARA SANGYO KAISHA, LTD.: titanium oxide), 2 parts by weight of DISPARLON 6500 (manufactured by Kusumoto Chemicals, Ltd.: fatty acid amide wax), 1 part by weight of TINUVIN 770 (manufactured by BASF: bis(2,2,6,6-tetramethyl-4-piperidyl)sebacate), and 1 part by weight of TINUVIN 326 (manufactured by BASF: 2-(3-tert-butyl-2-hydroxy-5-methylphenyl)-5-chlorobenzotriasole), uniformly dispersed with three rolls, and dehydrated under reduced pressure at 120° C. for 2 hours. Thereafter, the resultant was cooled to 50° C., and then added and mixed with 2 parts by weight of A-171 (manufactured by Momentive: vinyltrimethoxysilane), 3 parts by weight of A-1120 (manufactured by Momentive: N-(β-aminoethyl)-γ-aminopropyltrimethoxysilane), and 1 part by weight of DBU (1,8-diazabicyclo[5,4,0]undecene-7), and then sealed in a damp-proof cartridge under a condition substantially free from moisture.

(Skinning Time)

The skinning time was measured in the same manner as in Example 17. The results are presented in Table 6.

TABLE 6

| Composition | | Ex. 21 | Ex. 22 | Comp. Ex. 13 | Comp. Ex. 14 |
|---|---|---|---|---|---|
| Polymer | A-1 | 100 | 100 | | |
| | E-3 | | | 100 | 100 |
| Plasticizer | DINP | 55 | 55 | 55 | 55 |
| Calcium carbonate | CCR | 120 | 120 | 120 | 120 |
| Titanium oxide | TIPAQUE R820 | 20 | 20 | 20 | 20 |
| Anti-sagging agent | DISPARLON 6500 | 2 | 2 | 2 | 2 |
| Photostabilizer | TINUVIN 770 | 1 | 1 | 1 | 1 |
| Ultraviolet absorber | TINUVIN 326 | 1 | 1 | 1 | 1 |
| Dehydrating agent | A-171 | 2 | 2 | 2 | 2 |
| Adhesiveness imparting agent | A-1120 | 3 | 3 | 3 | 3 |
| Condensation catalyst | U-220H | 2 | | 2 | |
| | DBU | | 1 | | 1 |
| Curability | Skinning time (min.) | 28 | 300 | 53 | Uncured |

As is clear from Table 6, under the condition in which a tin catalyst such as U-220H or a non-tin condensation catalyst such as DBU is added, the curable composition including the organic polymer (A-4) exhibits more satisfactory curability as compared with the curable composition including the organic polymer (E-3).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A polymer comprising:
   a reactive silicon group represented by General Formula (1):

  (1)

wherein:
   each $R^1$ is independently a hydrocarbon group having 1 to 20 carbon atoms, wherein the hydrocarbon group of $R^1$ is optionally substituted with a hetero-containing group as a substituent,
   X is a hydroxyl group or a hydrolyzable group,
   a is 1, 2, or 3, and
   an atom adjacent to the reactive silicon group has an unsaturated bond; and
   a polyoxyalkylene main chain backbone selected from the group consisting of polyoxyethylene, polyoxypropylene, polyoxybutylene, polyoxytetramethylene, a polyoxyethylene-polyoxypropylene copolymer, and a polyoxypropylene-polyoxybutylene copolymer,
   the polymer has at least one structure selected from the group consisting of the structures represented by General Formulas (2) to (4):

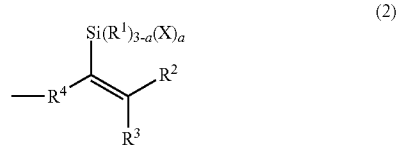  (2)

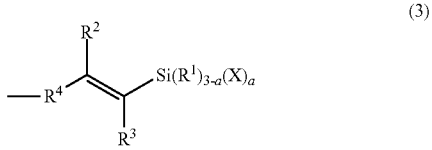  (3)

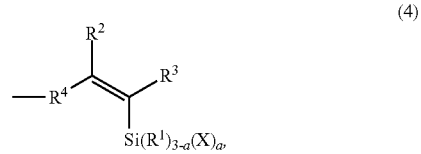  (4)

$R^4$ is a divalent linking group, wherein each of two bonds that $R^4$ has is bonded to a carbon atom, an oxygen atom, a nitrogen atom, or a sulfur atom in the linking group,
   $R^2$ and $R^3$ are each independently selected from a hydrogen, an alkyl group having 1 to 20 carbon atoms, an aryl group having 6 to 20 carbon atoms, an aralkyl group having 7 to 20 carbon atoms, or a silyl group, and
   $R^1$, X, and a are as described above.

2. The polymer according to claim 1, wherein the structures represented by General Formulas (2) to (4) are structures represented by General Formulas (5) to (7), respectively:

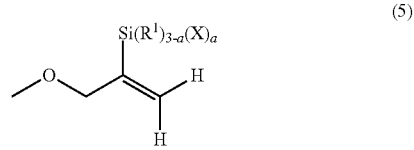  (5)

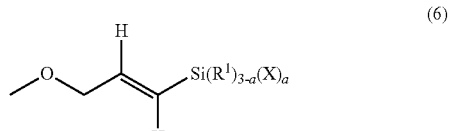  (6)

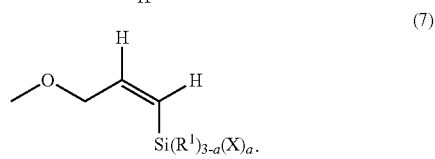  (7)

3. The polymer according to claim 1, wherein the polymer has the reactive silicon group represented by General Formula (1) in an average number of more than 0.8 per end.

4. The polymer according to claim 1, wherein the reactive silicon group is a dimethoxymethylsilyl group.

5. The polymer according to claim 1, wherein the reactive silicon group is a trimethoxysilyl group and/or a (methoxymethyl)dimethoxysilyl group.

6. A curable composition, comprising: the (A) polymer according to claim 1.

7. The curable composition according to claim 6, wherein the curable composition contains the (A) polymer; and
   a (B) curing catalyst.

8. The curable composition according to claim 7, wherein the curable composition comprises, as the (B) curing catalyst, at least one selected from the group consisting of an organotin compound, a metal carboxylate, an amine compound, a carboxylic acid, and an alkoxy metal.

9. The curable composition according to claim 7, wherein the curable composition comprises, as the (B) curing catalyst, a silane coupling agent having a hydrolyzable silicon group and an amino group in a molecule of the silane coupling agent.

10. The curable composition according to claim 9, wherein the curable composition comprises, as the (B) curing catalyst, no curable catalyst other than the silane coupling agent having a hydrolyzable silicon group and an amino group in a molecule of the silane coupling agent.

11. A cured product of the curable composition according to claim 6.

12. A method for producing a cured product, comprising:
   applying, casting, or filling the curable composition according to claim 6; and
   curing the curable composition which has been applied, cast, or filled.

13. A sealing material or an adhesive, consisting of the curable composition according to claim 6.

* * * * *